(12) United States Patent
Celikyilmaz et al.

(10) Patent No.: US 10,163,106 B2
(45) Date of Patent: Dec. 25, 2018

(54) SYSTEMS AND METHODS USING A DATA STRUCTURE SUMMARIZING ITEM INFORMATION IN AUTHORIZATION REQUEST MESSAGES FOR COMMUNICATION IN TRANSACTIONS INVOLVING MULTIPLE ITEMS

(71) Applicant: Visa International Service Association, San Francisco, CA (US)

(72) Inventors: Ilker Celikyilmaz, Mountain View, CA (US); Sivakumar Seshappan, Fremont, CA (US); Raman Chinnappan, Foster City, CA (US); Kalpana Jogi, San Francisco, CA (US); Tirtha Mauli Sarkar, Singapore (SG); Darpan Dewan, Foster City, CA (US); Thoithoi Chingakham, Singapore (SG); Michael Steven Bankston, Pacifica, CA (US)

(73) Assignee: Visa International Service Association, San Francisco, CA (US)

( * ) Notice: Subject to any disclaimer, the term of this patent is extended or adjusted under 35 U.S.C. 154(b) by 512 days.

(21) Appl. No.: 14/680,720

(22) Filed: Apr. 7, 2015

(65) Prior Publication Data
US 2015/0287034 A1 Oct. 8, 2015

Related U.S. Application Data

(60) Provisional application No. 61/976,426, filed on Apr. 7, 2014.

(51) Int. Cl.
*G06Q 20/40* (2012.01)
*G06Q 10/08* (2012.01)
*G06Q 30/02* (2012.01)

(52) U.S. Cl.
CPC ......... *G06Q 20/403* (2013.01); *G06Q 10/087* (2013.01)

(58) Field of Classification Search
USPC .......................................................... 705/28
See application file for complete search history.

(56) References Cited

U.S. PATENT DOCUMENTS

| 4,144,567 A | 3/1979 | Tadakuma et al. |
| 6,078,898 A | 6/2000 | Davis et al. |

(Continued)

FOREIGN PATENT DOCUMENTS

| EP | 1039403 | 9/2000 |
| WO | 2004012052 | 2/2004 |

OTHER PUBLICATIONS

"Recal Introduces WebSentry Reducing the Risk of Fraud for Internet Transactions; WebSentry Offers System Integrators Cost Effective SET Compliance for E-Commerece"—Canadian Corporate News May 26, 1999.
International Patent Application PCT/US03/23469, International Search Report, dated Apr. 26, 2004.
International Patent Application PCT/US03/23469, International Preliminary Search Report, dated Jul. 16, 2004.

*Primary Examiner* — Garcia Ade
(74) *Attorney, Agent, or Firm* — The Webb Law Firm (57) ABSTRACT

A system and method includes an authorization request message configured with information about transaction amounts of items aggregated according to item categories and applicable rates for the items in the respective categories. Based on the information provided in the authorization request, a transaction handler is configured to compute a modified transaction amount for the transaction by reducing the transaction amount of items in one or more of the categories, without reducing the transaction amount(s) of items in one or more other categories, and computing a total transaction amount based on the reduction and the applicable rates.

5 Claims, 6 Drawing Sheets (56) References Cited

U.S. PATENT DOCUMENTS

| | | | |
|---|---|---|---|
| 6,138,911 | A | 10/2000 | Fredregill et al. |
| 6,629,081 | B1 | 9/2003 | Cornelius et al. |
| 7,240,021 | B1 | 7/2007 | Walker et al. |
| 7,529,700 | B1 | 5/2009 | Kessler |
| 7,983,987 | B2 | 7/2011 | Kranzley et al. |
| 2001/0014868 | A1 | 8/2001 | Herz et al. |
| 2001/0016827 | A1 | 8/2001 | Fernandez |
| 2002/0002534 | A1 | 1/2002 | Davis et al. |
| 2002/0198831 | A1 | 12/2002 | Patricelli et al. |
| 2004/0019522 | A1 | 1/2004 | Bortolin et al. |
| 2007/0100691 | A1 | 5/2007 | Patterson |
| 2009/0319387 | A1 | 12/2009 | Keithley et al. |
| 2010/0010901 | A1 | 1/2010 | Marshall et al. |
| 2010/0049620 | A1 | 2/2010 | Debow |
| 2010/0100484 | A1 | 4/2010 | Nguyen et al. |
| 2011/0066483 | A1 | 3/2011 | Salmon et al. |
| 2011/0288918 | A1 | 11/2011 | Cervenka et al. |
| 2011/0302083 | A1 | 12/2011 | Bhinder |
| 2012/0101894 | A1 | 4/2012 | Sterling et al. |
| 2013/0091000 | A1 | 4/2013 | Hagey et al. |
| 2013/0124287 | A1 | 5/2013 | Bjorn et al. |
| 2013/0246150 | A1 | 9/2013 | Ovick et al. |
| 2013/0282461 | A1 | 10/2013 | Ovick et al. |
| 2014/0067677 | A1 | 3/2014 | Ali et al. |
| 2014/0136413 | A1 | 5/2014 | Mears |
| 2015/0120418 | A1* | 4/2015 | Cervenka ........... G06Q 30/0222 705/14.23 |

\* cited by examiner

SYSTEMS AND METHODS USING A DATA STRUCTURE SUMMARIZING ITEM INFORMATION IN AUTHORIZATION REQUEST MESSAGES FOR COMMUNICATION IN TRANSACTIONS INVOLVING MULTIPLE ITEMS

RELATED APPLICATIONS

The present application claims priority to Provisional U.S. Pat. App. Ser. No. 61/976,426, filed Apr. 7, 2014, the entire disclosure of which is hereby incorporated herein by reference.

The present application relates to U.S. patent application Ser. No. 14/525,729, filed Nov. 28, 2014 and entitled "Systems and Methods to Provide Rewards based on Purchased Items," U.S. Pat. App. Pub. No. 2011/0125565 entitled "Systems and Methods for Multi-Channel Offer Redemption," U.S. Pat. Pub. No. 2011/0288918 entitled "Systems and Methods for Redemption of Offers," U.S. Pat. App. Pub. No. 2013/0091000 entitled "Systems and Methods to Provide Discount at Point of Sales Terminals," U.S. Pat. App. Pub. No. 2013/0124287 entitled "Systems and Methods to Provide Discount at Point of Sales Terminals," U.S. Pat. App. Pub. No. 2013/0246150 entitled "Systems and Methods to Apply the Benefit of Offers via a Transaction Handler," U.S. Pat. App. Pub. No. 2013/0246273 entitled "Systems and Methods to Generate a Receipt for a Transaction," and U.S. Pat. App. Pub. No. 2013/0268333 entitled "Systems and Methods to Process Transactions and Offers via a Gateway," the entire disclosures of which applications are hereby incorporated herein by reference.

FIELD OF THE TECHNOLOGY

At least some embodiments disclosed herein relate to data communications in general and more specifically, but not limited to data structures for communication messages for transaction authorization.

BACKGROUND

In an electronic payment processing network, transaction data transmitted from one computing system to another is communicated based on standardized data structures for interoperability and based on different levels of data processing needs.

For example, when processing at level 1 according to a communication standard, the transaction data transmitted in the network includes basic data, such as method of payment, account number, billing address, transaction amount and data/time.

When processing at level 2 according to a communication standard, the transaction data includes not only the level 1 data, but also additional data, such as tax amount, tax identification, etc.

When processing at level 3 according to the communication standard, the transaction data includes not only the level 2 data, but also further data, such as item product code, item description, item tax rate, item tax identifier, alternative tax amount, etc.

For example, U.S. Pat. App. Pub. No. 2011/0302083, entitled "Method and System for Controlling Access to a Financial Account", describes some details of the transmission of level 1 data, level 2 data and level 3 data during the payment processing in the industry, at various level of details.

BRIEF DESCRIPTION OF THE DRAWINGS

The embodiments are illustrated by way of example and not limitation in the figures of the accompanying drawings in which like references indicate similar elements.

DETAILED DESCRIPTION

Authorization for a transaction may be requested for a plurality of different items. To reduce the amount of data to be transmitted via the authorization request, the information about the items is aggregated in one embodiment disclosed herein according to pre-defined item categories. Thus, instead of transmitting the item level information for individual items, the information aggregated according to respective item categories are transmitted, allowing computing systems configured on an electronic payment processing network to process the transaction at the category level. Thus, the communication efficiency of the system is improved.

Further, the aggregated category level information allows a computing device on the electronic payment processing network to apply changes to the transaction at category level and compute the modified transaction level information, such as the transaction amount. In comparison with the approach of transmitting the item level information that specifies details for individual items, the system and method using the aggregated category level information allows the shifting of a portion of the computation tasks from a centralized computer device to transaction terminals. Thus, the overall computing performance of the system is improved, in addition to the improvement in communication efficiency of the system.

Figure 1:
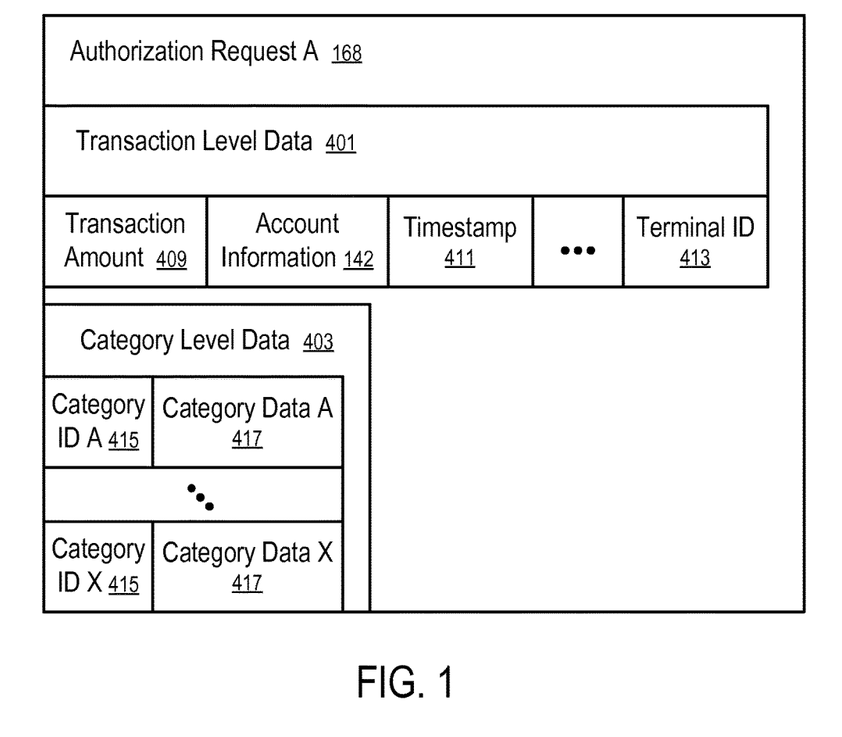
FIG. 1 shows a category level data structure of an authorization request according to one embodiment.

FIG. 1 shows a category level data structure of an authorization request according to one embodiment.

In FIG. 1, the authorization request (168) is configured to include both the transaction level data (401) and the category level data (403).

The transaction level data (401) includes data fields for attributes of the transaction for which authorization is being requested, such as the amount (409) of the transaction, the account information (142) in which the transaction is to be performed, the timestamp (411) (e.g., date and time) of the initiation of the transaction, the terminal ID (413) of the transaction terminal on which the transaction is initiated.

In FIG. 1, instead of providing item level data, the authorization request (168) includes category level data (403) that summarizes the items according to pre-determined item categories.

In FIG. 1, the authorization request (168) includes data fields for one or more item categories. For each item category, the authorization request (168) identifies a category ID (415) identifying a category and one or more fields of category data (417).

For example, the category data (417) for a corresponding category ID (415) may include the item count for the category and/or other information regarding the items in the category involved in the transaction, such as the aggregated transaction amount of the items in the category, the average unit price of the items in the category, the count of the items in the category, a rate for the item category, etc.

In one embodiment, the items summarized in the category identified by a category ID (415) may be different items having different item descriptions, and/or different unit prices. In summarizing the item details into the category data (417), the need to transmit the information specific for each item is removed.

Figure 2:
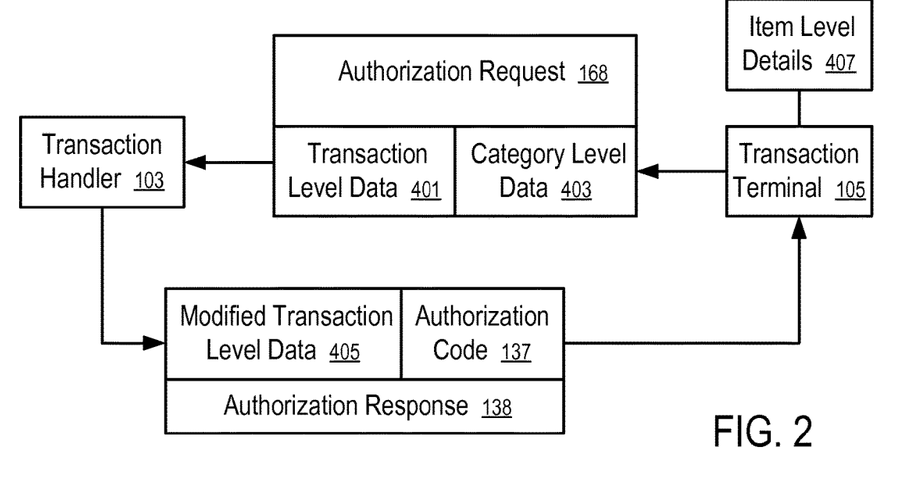
FIG. 2 shows a communication system using a category level data structure for an authorization request according to one embodiment.

FIG. 2 shows a communication system using a category level data structure for an authorization request according to one embodiment.

In FIG. 2, the transaction terminal (105) has item level details (407) for a payment transaction. The transaction terminal (105) generates an authorization request (168) for the payment transaction and transmits the authorization request (168) onto an electronic payment processing network, such as a network illustrated in FIG. 6.

In FIG. 2, the authorization request (168) includes transaction level data (401) and category level data (403) in a data structure illustrated in FIG. 1.

The transaction handler (103) in the payment processing network receives the authorization request (168), extracts the category level data (403), processes the category level data (403) to generate a modified transaction level data (405) for the generation of the authorization response (138) that contains an authorization code (137). In one embodiment, the authorization code (137) is a numerical or alphanumerical code sent from an issuer of an account as a unique identification of the authorization of the transaction in the account.

The techniques as discussed above in connection with FIGS. 1 and 2 can be used in the on-the-fly redemption of offer benefits and the application of the offer benefits to a payment transaction where the offer benefits are applicable to some of the items but not all of the items purchased via the payment transaction, as further discussed below.

For example, a list of items (e.g., products or services) eligible for the benefit (e.g., rewards and/or discounts) of a program is created and maintained.

Examples of such a list examples include: list of fresh produce that an Electronic Benefit Transfer (EBT) cardholder would qualify for a healthy eating program reward; list of CPG (Consumer Packaged Goods) products where a CPG company is offering Direct Connect cardholders a 10% discount when Direct Connect Visa Cards are used to make the payments for the purchases of the CPG products; list of services purchased with a Private Label Rewards Card through a payment processor sponsored merchant website.

The list identifying the eligible items is provided to participating merchants and stored for usage during check-out at the transaction terminals of the participating merchants, such as the POS terminals of the merchants.

When a cardholder of a payment account makes a purchase at such a POS terminal using a card that identifies the payment account, the bank identification number (BIN) associated with or embedded in the account information of the card is used to determine whether the cardholder is eligible for the benefit of the program. For example, a specific bank identification number (BIN) may be used to issue payment cards/accounts that are eligible for benefits provided by the program.

In one embodiment, whether or not a payment account is eligible for benefits of the program can be determined from the account information used on the POS terminal to initiate a payment transaction in the respective account identified by the account information. For example, the eligibility for benefits provided by the program may be based on whether or not the account information includes a specific bank identification number (BIN). Alternatively, the eligibility may be determined via a query to a portal of a database that stores a data correlating the account information and eligibility for benefits provided by the program. The benefit of the program may be offered to a specific type of payment accounts, and/or to a specific set of payment accounts. In a further embodiment, the POS terminal is not tasked to determine the eligibility based on the payment account; and a payment processor (e.g., an issuer or a transaction handler) is configured to determine the eligibility based on the payment account and/or the identity of the user of the payment account during the processing of the transaction in the payment account of the cardholder.

In one embodiment, the eligibility of the benefit of the program is based on not only the account information, but also the items purchased.

For example, when the cardholder presents a participating card/account at a POS terminal of a participating merchant to pay for a set of items at time of POS check-out, the POS terminal is configured to check the set of purchased items against the list to identify a subset of the purchased items eligible for the benefits of the program.

In one embodiment, the POS terminal is configured to check the items when the payment account is determined to be eligible for the benefit of the program. Alternatively, the POS terminal is not tasked to determine eligibility based on the account information; the POS terminal is configured to determine eligible items without determining whether the payment account identified by the account information is eligible for the program; and a payment processing network is configured to determine whether the eligible items purchase via the payment account is qualified for the benefits of the program.

In one embodiment, the POS terminal is configured to provide information about the eligible items in an authorization request for the transaction in the payment account of the cardholder.

For example, the POS terminal of the participating merchant may provide the information regarding the eligible items in Field 104 of the authorization message in compliance with an International Organization for Standardization (ISO) standard.

For example, the information provided in the authorization request may include a category code identifying a category of items that are eligible for a predefined benefit of the program, an item count identifying the number of purchase items that are in the category, and the total dollar amount of the number of purchased items in the category. The program may provide different benefits for items under different categories; and the information provided in the authorization request aggregates eligible items according to category to reduce information to be transmitted in the authorization request, while allowing the control of benefit distribution at item level.

When such a technique of identifying eligible items by category is used, it is possible to combine multiple lists of items associated with different benefits provided by different programs into a single list and utilize categories to differentiate between the different programs. A standardized specification can be developed to identify the layout of the aggregated eligible item information in the authorization message in accordance with an International Organization for Standardization (ISO) standard.

A payment processor (e.g., a transaction handler or an issuer processor) is configured to provide the benefits to the transaction according to the aggregated eligible item information provided in the authorization message.

Examples of the benefits include topping up points or dollars to the same payment card/account or a companion card/account, updating the authorization response to apply a discount at the POS, using the information to access an electronic purse of the user associated with the consumer card/account to provide at least a portion of the funds for a payment, redeeming reward points, and/or providing in the corresponding authorization response a Promotion Code that causes the POS to perform a function at the POS terminal, such as applying a discount, printing a message, etc.

The merchant and the consumer would complete checkout at the POS terminal upon receipt of the authorization response from the payment processing network. Data in the authorization response may trigger a discount at the POS terminal and/or result in display of information on the receipt. Optionally, the cardholder may receive an email or mobile alert/message from a portal coupled with the payment processor regarding the benefits applied to the transaction.

The payment processing network is configured to settle with the entity or entities funding the benefits (e.g., reward, discount), such as CPG, manufactures, service providers, government entities, and merchants.

Separately, the payment processor (e.g., the transaction handler or issuer processor) may provide a tool for the cardholder to specify rules for the associated electronic purse for processing the payment transaction. For example, the rules may request the use of purse funds/points first or last. For example, the rules may require that if the purchase amount is more than X or less than X, a specific funding source is used.

In one embodiment, the list(s) of eligible items and/or the account information can be used by the merchant to include a pre-specified code in the authorization message at time of check-out; and the pre-specified code is configured to cause a payment processor (e.g., the transaction handler or issuer processor to process the payment according to the rules and/or provide the benefits according to the program(s).

Figure 3:
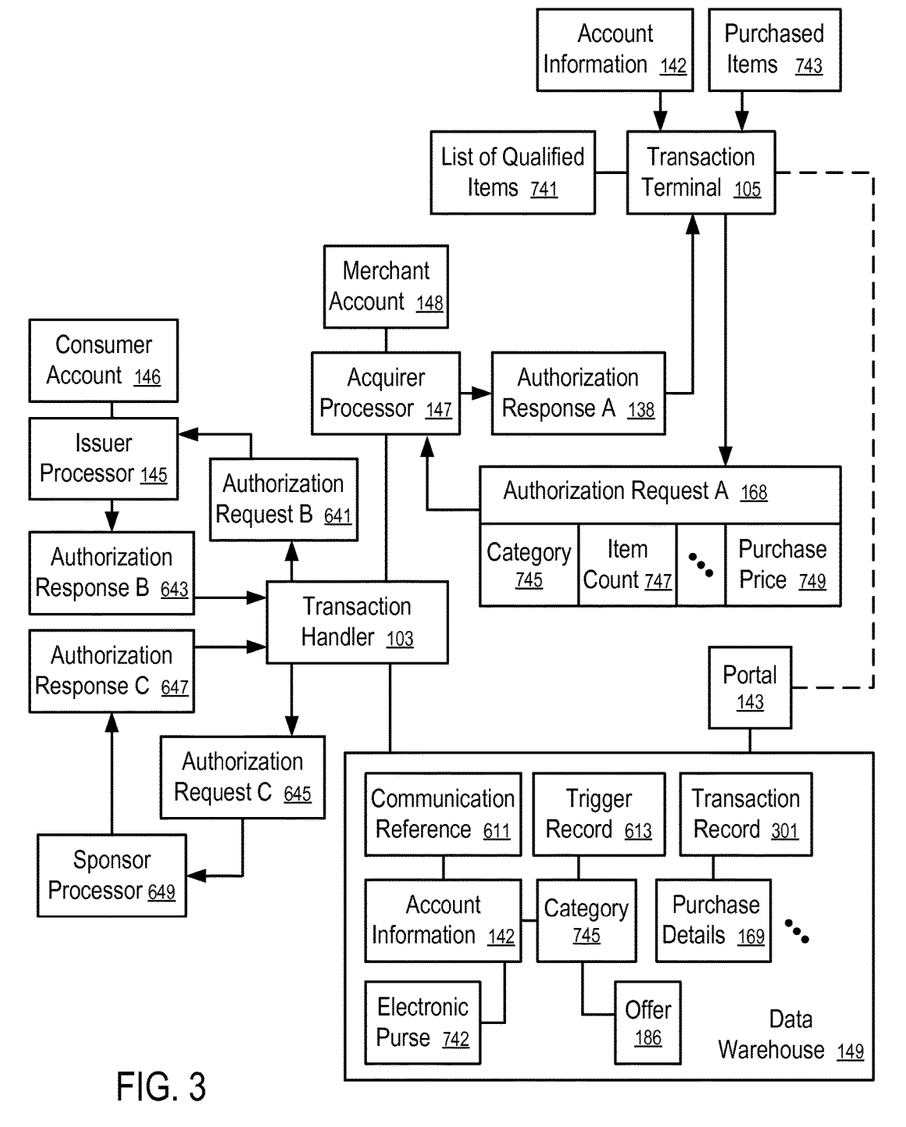
FIG. 3 shows a system to provide item level benefits according to one embodiment.

FIG. 3 shows a system to provide item level benefits according to one embodiment.

In FIG. 3, the transaction terminal (105) is configured to store a list of items that are qualified for a benefit under a category (745).

When the transaction terminal (105) processes a payment transaction for purchased items (743) using the account information (142) of a user, the transaction terminal (105) determines a subset of the purchased items (743) that are on the list (741) for the benefit of the category (745).

In one embodiment, the identification of the subset of eligible item at the transaction terminal (105) is also based on the account information (142). For example, if the account information (142) includes a bank identification number (BIN) associated with a program that provides the benefit for the category (745), the subset of the purchased items that are on the list (741) are selected; otherwise, no purchased item will be qualified. Alternatively, the transaction terminal (105) is configured to identify the subset of purchased items that are on the list (741) without determining whether the user of the account information (142) is enrolled the program.

In FIG. 3, the transaction terminal (105) is configured to generate an authorization request (168) and provide aggregated item information in the authorization request (168). The aggregated item information includes the category (745) that is pre-associated with the benefits of the program, the item count (747) of the eligible items in the subset, and the total purchase price (249) of the eligible items in the subset.

When there are different sets of pre-defined benefits for different categories, the authorization requests (168) is configured to include multiple sets of aggregated item information, each set corresponding to one category.

In one embodiment, the transaction terminal (105) is configured to optionally provide purchase details (169) of the subset of eligible items to the data warehouse (149) via a portal (149).

In FIG. 3, the authorization request (168) is transmitted to a transaction handler (103) via the acquirer processor (147) that is in control of the merchant account (148) of the transaction terminal (105).

In FIG. 3, the data warehouse (149) coupled with the transaction handler (103) is configured to store the account information (142) in association with the category (745) of the offer (186) that provides benefits such as reward points, discounts, etc. Optionally, the data warehouse (149) further stores electronic purse (742) that identifies additional payment account(s) that may be used to provide funds for the transaction initiated using the account information (142), reward accounts to receive the rewards of the offer (186), reward/loyalty accounts from which points may be redeemed to fund a portion of the transaction initiated using the account information (142), etc.

In FIG. 3, the transaction handler (103) is configured to process the transaction initiated using the account information (142) using funds from the accounts identified by the account information, the offer (186), and/or the electronic purse (742), in a way as discussed in U.S. Pat. App. Pub. No. 2011/0125565 entitled "Systems and Methods for Multi-Channel Offer Redemption," U.S. Pat. Pub. No. 2011/0288918 entitled "Systems and Methods for Redemption of Offers," U.S. Pat. App. Pub. No. 2013/0091000 entitled "Systems and Methods to Provide Discount at Point of Sales Terminals," U.S. Pat. App. Pub. No. 2013/0124287 entitled "Systems and Methods to Provide Discount at Point of Sales Terminals," U.S. Pat. App. Pub. No. 2013/0246150 entitled "Systems and Methods to Apply the Benefit of Offers via a Transaction Handler," U.S. Pat. App. Pub. No. 2013/0246273 entitled "Systems and Methods to Generate a Receipt for a Transaction," and U.S. Pat. App. Pub. No. 2013/0268333 entitled "Systems and Methods to Process Transactions and Offers via a Gateway," the entire disclosures of which applications are hereby incorporated herein by reference.

Further, the transaction handler (103) is configured to receive benefits of the offer (186) for the transaction using funds from the accounts identified by the account information, the offer (186), and/or the electronic purse (742), such as reward points, loyalty points, cashback, assistance funds, reimbursement, matching funds, etc.

For example, the sponsor processor (649) may provide a portion of funds for the payment transaction based on a benefit for the purchase price (749) of the category (745) of the subset of the purchased items (743).

For example, the sponsor processor (649) may provide reward funds or points based on a benefit for the purchase price (749) of the category (745) of the subset of the purchased items (743).

In some embodiments, the transaction handler (103) is configured to communicate a second issuer processor identified by the electronic purse (742) to supply a portion of the funds for the payment to the merchant for the purchased items (743).

In one embodiment, the transaction handler (103) is configured to communicate with the sponsor processors (e.g., 649) and the issuer processors (e.g., 145) in parallel for the authorization of the portions of the funds of the transaction and/or the rewards resulting from the transaction. After the sponsor processors (e.g., 649) and the issuer processors (e.g., 145) approve the respective portion of the funds and rewards, the transaction handler (103) provides a single authorization response (138) via the acquirer processor (147).

In one embodiment, the benefit of an offer is configured to be applicable to a portion of purchased items that are subjected to a tax rate that is different from the tax rate of other items a user may purchase with the portion of items. An authorization message is configured to use an authorization message to transmit information that identifies the tax rates of the portions of items that are purchased from a merchant with a single payment made using a consumer payment account.

For example, the authorization request message for a payment transaction in a consumer account is configured in one embodiment to identify the categories of items purchased via the payment transaction, the tax rates of the items in the respective categories, and the sub-total of the purchase prices of the items in the respective categories. Thus, the information received in the authorization request can be combined with the offer information that identifies the benefit to be afforded to a category of items to compute the modified total transaction amount that includes the benefit of the offer and the applicable taxes. After the modified total transaction amount is computed, the authorization for the modified total transaction amount in the consumer payment account can be performed via communication between the transaction handler of the payment processing network, and the issuer processor of the consumer payment account.

The tax rate information and corresponding transaction sub-totals can be used to apply discounts on a pre-tax basis. For example, different categories of items purchased via the same payment transaction in a consumer account may subject to different tax rates. The merchant or a third party sponsor may offer benefits that are applicable to a predetermined category of purchased items but no other categories. The benefit may be proportional to the sub-total of the items in the predetermined category, or based on whether the sub-total meets a predetermined threshold. Based on the offer rules and the information provided in the authorization request message, the transaction handler is configured to compute a modified transaction amount for the payment transaction in the consumer account, and communicate with an issuer processor of the consumer account to obtain an authorization response for the modified transaction amount in the consumer account. Thus, the benefit of the offer can be provided to the consumer account during the authorization of the payment transaction.

Figure 4:
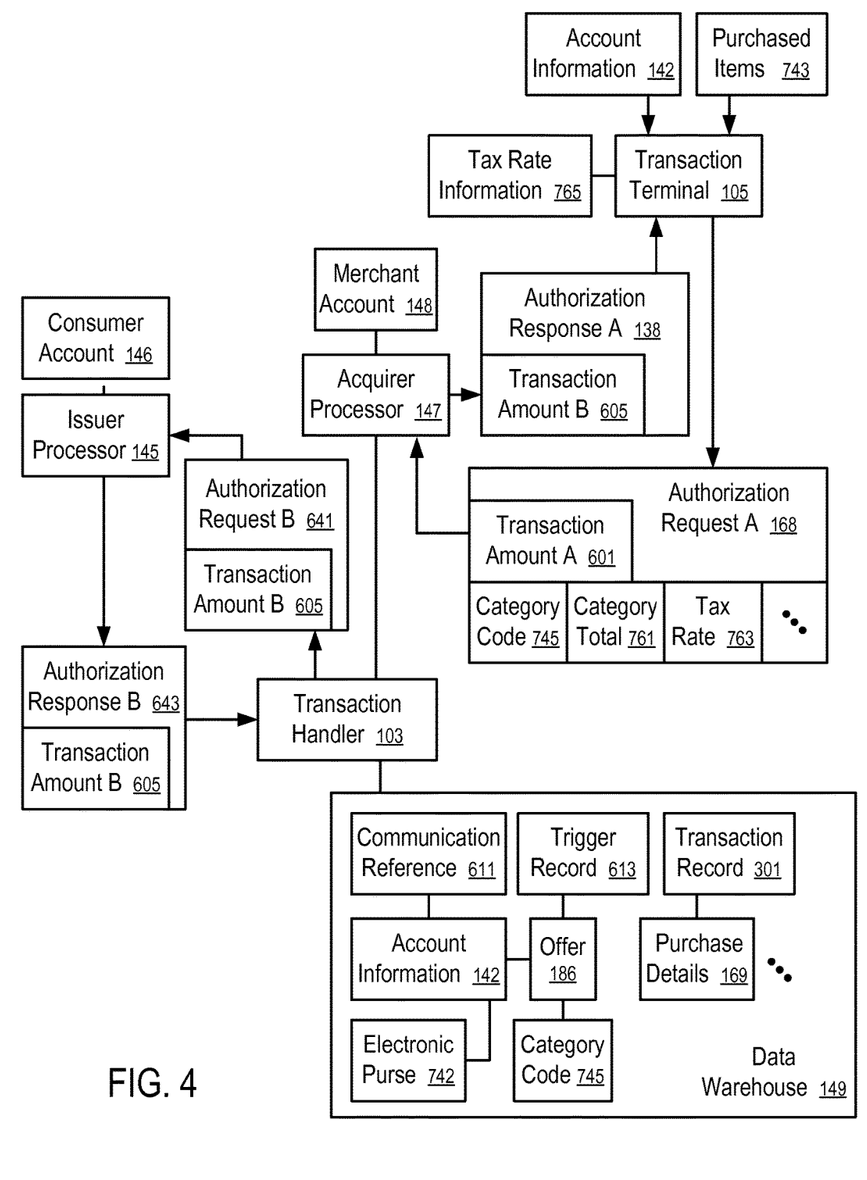
FIGS. 4 and 5 show systems to process pre-tax offer benefits according to some embodiments.
Figure 5:
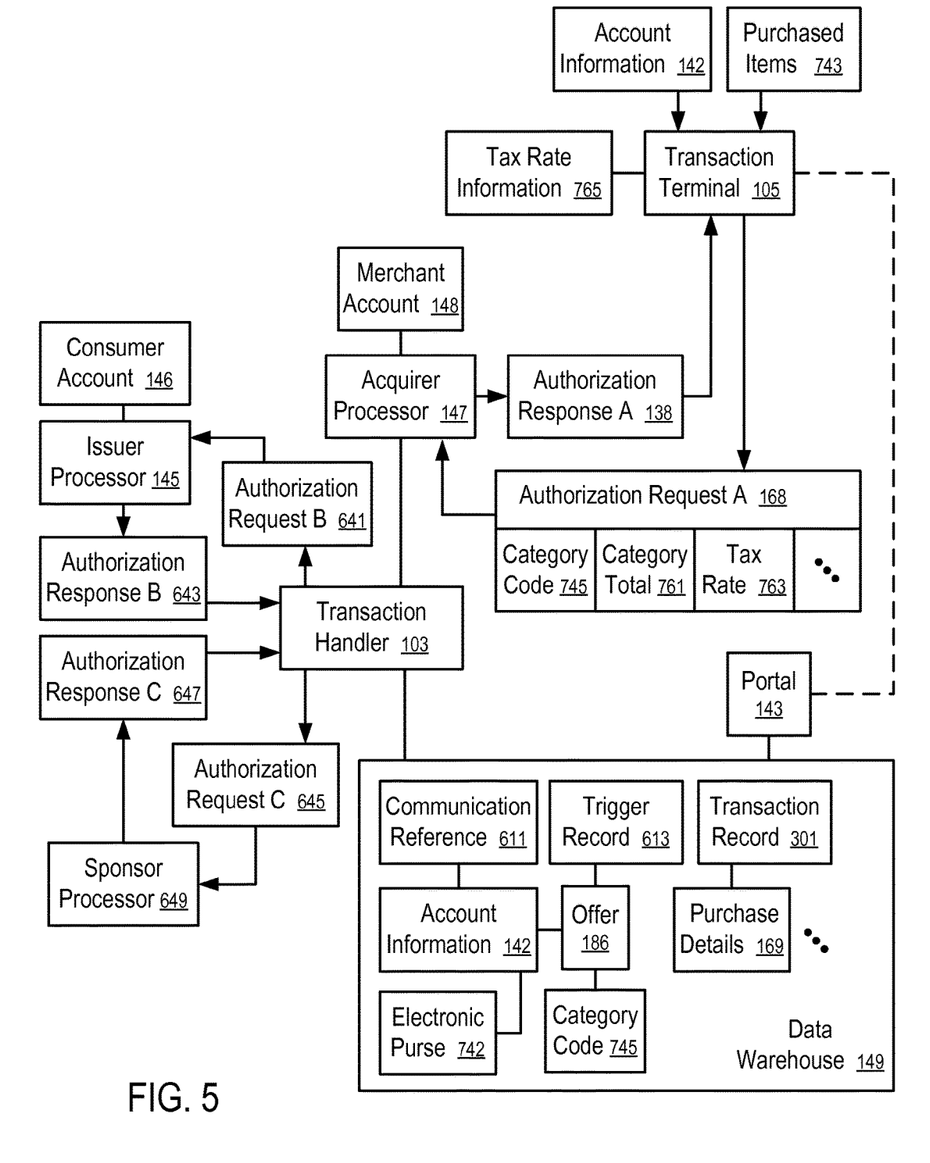

FIGS. 4 and 5 show systems to process pre-tax offer benefits according to some embodiments.

In one embodiment, a list of items (e.g., products or services) subjected to different tax rates and/or offer benefits is created and maintained. For each item in the list, the list identifies a tax category and/or an offer category for the item.

In some embodiments, the offer categories are designed to be the same as the tax categories. Alternatively, the offer categories of the items may be different and separate from the tax categories.

The list is stored in a merchant system to generate purchase details (169) summarized according to categories (e.g., tax categories and/or offer categories) for transmission via an authorization request message from the transaction terminal (105) of the merchant.

For example, when a user of a consumer payment account (146) makes a purchase at such a transaction terminal (105) using account information (142) that identifies the consumer payment account (146), the transaction terminal (105) is configured to generate the purchase details (169) summarized according to the categories, and embedded the summarized purchase details (169) in the authorization request (168) generated by the transaction terminal (105) for the payment transaction in the consumer account (146). A payment processor in the payment processing network, such as the transaction handler (103) of the payment processing network or the issuer processor (145) of the consumer account (146), may use the summarized purchase details (169) embedded in the authorization request (168) to determine the eligibility of offer benefits for the payment transaction and if eligible, apply the offer benefits to the payment transaction via modification of the transaction amount in the consumer account (146).

In one embodiment, the eligibility of the benefit of an offer (186) stored in association with the account information (142) of the consumer account (146) is based at least in part on the tax category of the items purchased. Separately, or in combination, the benefit of the offer (186) stored in association with the account information (142) of the consumer account (146) is applied based on the pre-tax purchase amount of the items purchased in a category.

In one embodiment, the information provided in the authorization request (168) includes a category code (745) identifying a category of items, a category total (761) of the purchase prices of the items in the category identified by the category code (745), and the tax rate (763) of the items in the category identified by the category code (745). The category total (761) may or may not include the applicable tax charged according to the tax rate (763). If the category total (761) includes the applicable tax, the pre-tax total can be computed based on the tax rate (763).

In some embodiments, when the tax rate (763) is sufficient to indicate the category code (745), the category code (745) can be omitted from the authorization request (168). Similarly, when the category code (745) is sufficient to indicate the tax rate (763), the tax rate (763) can be omitted from the authorization request (168).

For example, the data warehouse (149) may store a look up table to determine the tax rate of a category associated with a merchant at a location identified by the location of the transaction terminal (105).

For example, the data warehouse (149) may store a look up table to determine a category of a tax rate associated with a merchant at a location identified by the location of the transaction terminal (105).

The purchase details aggregated and/or summarized according to categories reduce information provided in the authorization request (168), while providing sufficient information for the determination of benefit eligibility and/or the amount of offer benefit.

For example, an offer may require a purchase of items in a category over a predetermined threshold amount on pre-tax basis to qualify for the benefit of the offer.

For example, an offer may provide an offer benefit that is proportional to the pre-tax purchase total of items in a predetermined category.

Thus, the category total (761) and the tax rate (763) provided in the authorization request (168) allows a payment processor (e.g., a transaction handler (103) or an issuer processor (145)) to determine and/or provide the benefits applicable to the transaction.

In one embodiment, the transaction terminal (105) is configured to store tax rate information (765), which identifies the tax categories and tax rates of items that may be sold via the transaction terminal (105).

When the transaction terminal (105) processes a payment transaction for purchased items (743) using the account information (142) of a user, the transaction terminal (105) determines a subset of the purchased items (743) that are identified on the list (765) as being in a category represented by the category code (745), having a tax rate (763), and/or possibly relevant to the offers, the benefit of which may be applied in an automated way via the payment processing network.

In one embodiment, the identification of the category of the relevant items at the transaction terminal (105) is also based on the account information (142). For example, if the account information (142) includes a bank identification number (BIN) associated with a program that provides the benefit for the category code (745), the category of the purchased items that are on the list (741) are identified to generate summarized purchase details; otherwise, no purchased item will be qualified. Alternatively, the transaction terminal (105) is configured to identify the category of purchased items that are on the list (741) without determining whether the user of the account information (142) is enrolled the program.

The transaction terminal (105) is further configured to generate an authorization request (168) and provide the summarized purchase details in the authorization request (168), including the category code (745), the category total (761) of the purchase prices of the items associated with the category code (745), and the tax rate (763) of the category code (745).

In one embodiment, the transaction terminal (105) generates a summary for each category. Alternatively, the transaction terminal (105) is configured to generate a summary for each category that is relevant to the offers (e.g., 186) hosted in the data warehouse (149) for automated offer redemption.

When there are different sets of pre-defined benefits for different categories, the authorization requests (168) is configured to include multiple sets of summarized purchase details, each set corresponding to a combination of a benefit category and a tax rate.

In one embodiment, the transaction terminal (105) is configured to optionally provide purchase details (169) of relevant items to the data warehouse (149) via a portal (149), without going through the acquirer processor (147).

In FIG. 4, the authorization request (168) is transmitted to a transaction handler (103) via the acquirer processor (147) that is in control of the merchant account (148) of the transaction terminal (105).

In FIG. 4, the data warehouse (149) coupled with the transaction handler (103) is configured to store the account information (142) in association with an offer (186) that identifies the category code (745) for automated redemption of offer benefits, such as reward points, discounts, etc.

Optionally, the data warehouse (149) further stores electronic purse (742) that identifies additional payment account(s) that may be used to provide funds for the transaction initiated using the account information (142), reward accounts to receive the rewards of the offer (186), reward/loyalty accounts from which points may be redeemed to fund a portion of the transaction initiated using the account information (142), etc.

When the payment transaction is eligible for the benefit of the offer (186), the portal (143) and/or the transaction handler (103) is configured to compute a modified transaction amount in the consumer account (146) based on the category total (761), the tax rate (763), and the rules of the offer (186).

The transaction handler (103) is configured to process the transaction initiated using the account information (142) using funds from the accounts identified by the account information, the offer (186), and/or the electronic purse (742).

Further, the transaction handler (103) is configured to receive benefits of the offer (186) for the transaction using funds from the accounts identified by the account information, the offer (186), and/or the electronic purse (742), such as reward points, loyalty points, cashback, assistance funds, reimbursement, matching funds, etc.

For example, in FIG. 4, the merchant provides the benefit of the offer (186). The transaction handler (103) is configured to compute an amount of adjustment based on the category total (761), the tax rate (763) and the rules of the offer (186), and apply the adjustment to the original transaction amount (601) requested in the authorization request A (168) to determine the modified transaction amount (605) provided in the authorization request (641) transmitted to the issuer processor (145). The authorization response (643) for the modified transaction amount (605) is propagated from the issuer processor (145), to the transaction terminal (105) via the transaction handler (103) and the acquirer processor (147) in the payment processing network.

For example, in FIG. 5, the sponsor processor (649) may provide a portion of funds for the payment transaction based on a benefit determined from the category total (761) for the category code (745) and the tax rate (763) of the category code (745).

For example, the sponsor processor (649) may provide reward funds or points based on a benefit for the purchase price (749) of the category (745) of the subset of the purchased items (743).

In some embodiments, the transaction handler (103) is configured to communicate a second issuer processor identified by the electronic purse (742) to supply a portion of the funds for the payment to the merchant for the purchased items (743).

In one embodiment, the transaction handler (103) is configured to communicate with the sponsor processors (e.g., 649) and the issuer processors (e.g., 145) in parallel for the authorization of the portions of the funds of the transaction and/or the rewards resulting from the transaction. After the sponsor processors (e.g., 649) and the issuer processors (e.g., 145) approve the respective portion of the funds and rewards, the transaction handler (103) provides a single authorization response (138) via the acquirer processor (147).

Figure 9:
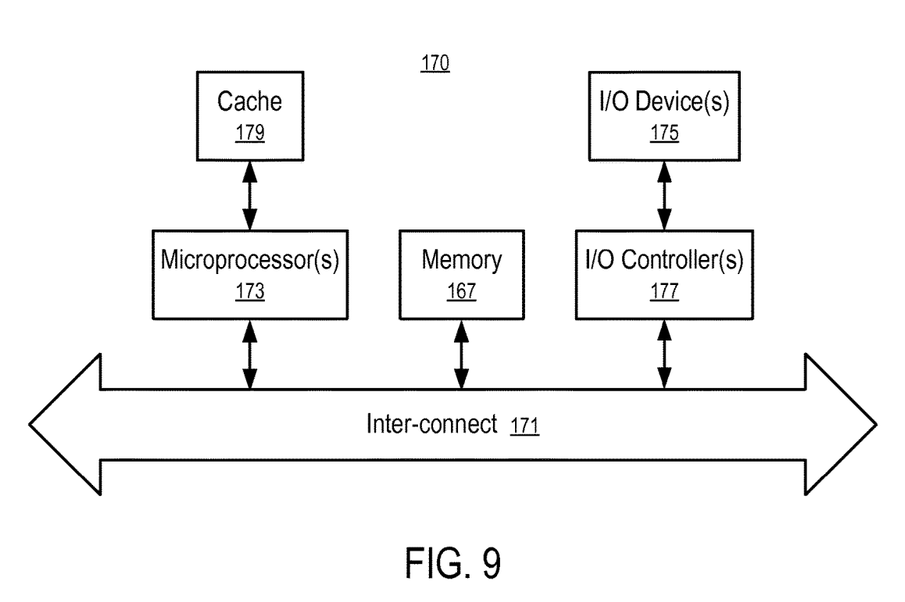
FIG. 9 illustrates a data processing system according to one embodiment.

In one embodiment, each of the transaction handler (103), the data warehouse (149), the portal (143), the issuer processor (145), the acquirer processor (147), the transaction handler (105), the sponsor processor (649) is implemented using at least one data processing system illustrated in FIG. 9.

The present application includes systems and methods configured to improve the overall system performances, including interoperability, transaction integrity, efficiency in processing payments in combination with offers, time delay in processing, resource allocation, etc., and/or to provide enhanced services.

In one embodiment, a transaction terminal is configured to store a list of items (e.g., products or services) eligible for benefits such as rewards and/or discounts, check items purchased by a user via a transaction in a payment account of the user against the list to identify items eligible for the benefits, aggregate the eligible items according to benefit categories, and provide information about the eligible items aggregated according to the benefit categories in an authorization request for the transaction in the payment account of the user. A payment processing network corresponding to the payment account is configured to process the authorization of the transaction and provide the benefits to the transaction using the aggregated information provided in the authorization request, during authorization and/or settlement of the transaction.

In one embodiment, an authorization request message is configured to provide information about transaction amounts of purchased items aggregated according to categories of the purchased items and the tax rates of the respective categories. Based on the information provided in the authorization request, the transaction handler is configured to apply a discount to one or more of the categories, and compute a transaction amount that includes the discount and the tax amounts.

Figure 6:
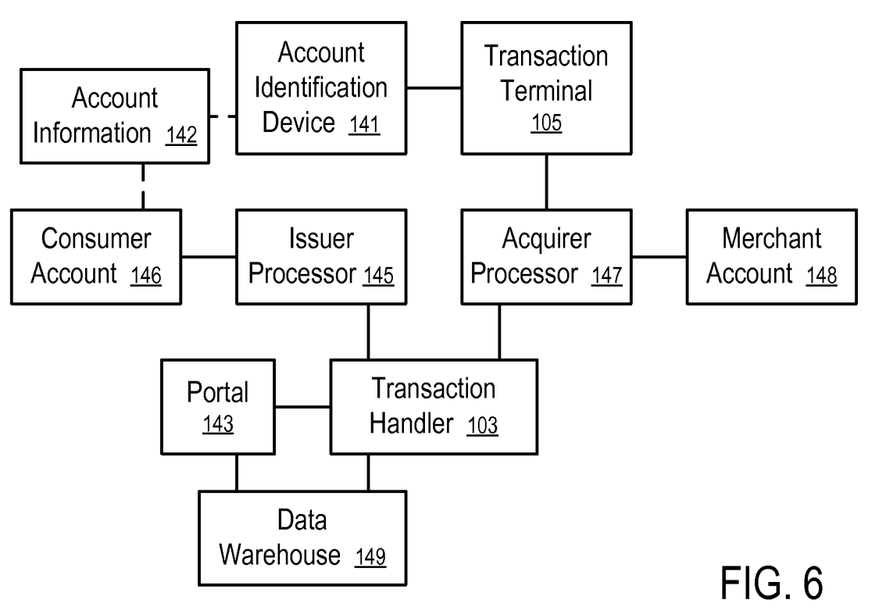
FIG. 6 shows a system to provide information based on transaction data according to one embodiment.

FIG. 6 shows a system to provide information based on transaction data according to one embodiment.

In FIG. 6, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user and the merchant.

Figure 7:
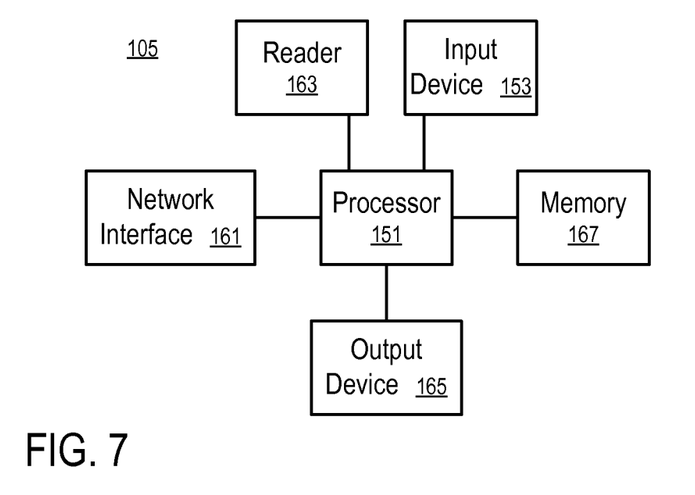
FIG. 7 illustrates a transaction terminal according to one embodiment.
Figure 8:
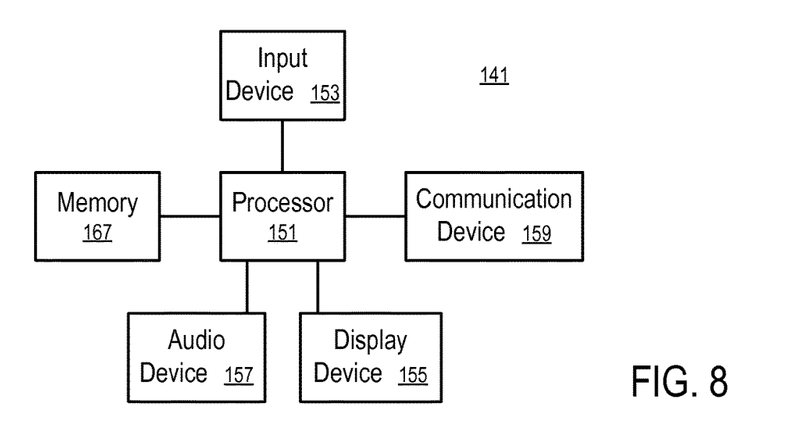
FIG. 8 illustrates an account identifying device according to one embodiment.

FIGS. 7 and 8 illustrate examples of transaction terminals (105) and account identification devices (141). FIG. 9 illustrates the structure of a data processing system (170) that can be used to implement, with more or fewer elements, at least some of the components in the system, the transaction handler (103), the portal (143), the data warehouse, the account identification device (141), the transaction terminal (105), etc. Some embodiments use more or fewer components than those illustrated, such as, in FIGS. 6-9, and other figures.

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data. For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data and/or offers of benefits such as discount, reward, points, cashback, etc. The offers can be communicated to the users via the advertisement data or as part of the advertisement data.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data is combined with external data, such as surveys, benchmarks, search engine statistics, demographics, competition information, emails, etc., to flag key events and data values, to set customer, merchant, data or event triggers, and to drive new transactions and new customer contacts.

Transaction Processing and Data

FIG. 6 shows a system to provide information and/or services based on transaction data according to one embodiment.

In FIG. 6, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles, aggregated spending profile, offer redemption notification, etc. The portal (143) may be implemented as a web portal, a telephone gateway, a file/data server, etc.

In FIG. 6, the transaction terminal (105) initiates the transaction for a user (e.g., a customer) for processing by a transaction handler (103). The transaction handler (103) processes the transaction and stores transaction data about the transaction, in connection with account data, such as the account profile of an account of the user. The account data may further include data about the user, collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data and the corresponding account data are used to generate intelligence information about the purchase behavior, pattern, preference, tendency, frequency, trend, amount and/or propensity of the users, as individuals or as a member of a group. The intelligence information can then be used to generate, identify and/or select targeted advertisements for presentation to the user on a point of interaction, during a transaction, after a transaction, or when other opportunities arise.

In FIG. 6, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user through a web connection. In one embodiment, the user may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 6, the transaction handler (103) uses the data warehouse (149) to store the records about the transactions, such as the transaction records or transaction data.

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 6, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 6, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user to organize the transactions in one or more consumer accounts (146) of the user with one or more issuers. The user may organize the transactions using information and/or categories identified in the transaction records, such as merchant category, transaction date, amount, etc. Examples and techniques in one embodiment are provided in U.S. patent application Ser. No. 11/378,215, filed Mar. 16, 2006, assigned U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned U.S. Pat. App. Pub. No. 2009/0048884, and entitled "Merchant Benchmarking Tool," the disclosure of which application is hereby incorporated herein by reference.

Transaction Terminal

FIG. 7 illustrates a transaction terminal according to one embodiment. The transaction terminal (105) illustrated in FIG. 7 can be used in various systems discussed in connection with other figures of the present disclosure. In FIG. 7, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 7. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 7. For example, in one embodiment, the transaction terminal (105) is an ATM machine, which includes components to dispense cash under certain conditions.

Account Identification Device

FIG. 8 illustrates an account identifying device according to one embodiment. In FIG. 8, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 8, such as a cellular communications subsystem.

In one embodiment, the communication device (159) may access the account information (142) stored on the memory (167) without going through the processor (151).

In one embodiment, the account identification device (141) has fewer components than those illustrated in FIG. 8. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Hardware

In one embodiment, a computing apparatus is configured to include some of the components of systems illustrated in various figures, such as the transaction handler (103), the portal (143), and their associated storage devices, such as the data warehouse (149).

In one embodiment, at least some of the components such as the transaction handler (103), the transaction terminal (105), the portal (143), the issuer processor (145), the acquirer processor (147), and the account identification device (141), can be implemented as a computer system, such as a data processing system (170) illustrated in FIG. 9. Some of the components may share hardware or be combined on a computer system. In one embodiment, a network of computers can be used to implement one or more of the components.

Further, the data illustrated in the figures, such as transaction data, account data, can be stored in storage devices of one or more computers accessible to the corresponding components. For example, the transaction data can be stored in the data warehouse (149) that can be implemented as a data processing system illustrated in FIG. 9, with more or fewer components.

In one embodiment, the transaction handler (103) is a payment processing system, or a payment card processor, such as a card processor for credit cards, debit cards, etc.

FIG. 9 illustrates a data processing system according to one embodiment. While FIG. 9 illustrates various components of a computer system, it is not intended to represent any particular architecture or manner of interconnecting the components. One embodiment may use other systems that have fewer or more components than those shown in FIG. 9.

In FIG. 9, the data processing system (170) includes an inter-connect (171) (e.g., bus and system core logic), which interconnects a microprocessor(s) (173) and memory (167). The microprocessor (173) is coupled to cache memory (179) in the example of FIG. 9.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing apparatus, comprising:
  a data warehouse storing data associating a discount offer having a predefined benefit with a payment account and data associating the discount offer with a category code, the category code identifying a category of items that are eligible for the predefined benefit of the discount offer; and
  a transaction handler having at least one processor configured on an electronic payment processing network in which the transaction handler interconnects at least one acquirer and at least one issuer of the payment account, the transaction handler further configured to:
    receive from the acquirer a first authorization request message for a payment transaction in the payment account, the authorization request message including a first category code identifying a first category of items that are eligible for the predefined benefit of the discount offer and the authorization request message having a data structure including:
      a first set of data fields identifying a plurality of rates;
      a second set of data fields specifying a plurality of pre-tax transaction sub-amounts corresponding to the plurality of rates;
      a third data field identifying the payment account, wherein each of the pre-tax transaction sub-amounts are pre-tax purchase prices of items aggregated according to each of a plurality of categories of items corresponding to each of the plurality of rates respectively for the items to be purchased via the payment transaction, wherein each of the plurality of rates identifies applicable sales taxes for items in each of the plurality of categories of items; and
      a fourth data field identifying a first transaction amount for the payment transaction;
    determine that the first category of items having pre-tax purchase prices aggregated according to the first category of items corresponding to a first rate of the plurality of rates are entitled to the predefined benefit of the discount offer based on determining that the first category code included in the authorization message corresponds to the category code associated with the discount offer stored in the data warehouse, wherein determining that items having pre-tax purchase prices aggregated according to the first category of items corresponding to the first rate of the plurality of rates are entitled to the predefined benefit of the discount offer comprises determining that the aggregated pre-tax purchase prices of the first category of items satisfy a predetermined threshold of a pre-tax purchase amount;
    determine a second transaction amount for the payment transaction based on determining that items having purchase prices aggregated according to the first category of items corresponding to a first rate of the plurality of rates are entitled to the predefined benefit of the discount offer, wherein determining the second transaction amount comprises determining:
      the benefit of the discount offer,
      the rates specified in the first set of data fields of the first authorization request message, and
      the transaction sub-amounts specified in the second set of data fields of the first authorization request message;
    generate a second authorization request message based on determining the second transaction amount for the payment transaction, the second authorization message having a first data field identifying the second transaction amount and a second data field identifying the payment account;
    transmit the second authorization request message to the issuer of the payment account for authorization of the payment transaction having the second transaction amount;
    receive from the issuer an authorization response for the second transaction amount; and
    transmit to the acquirer an authorization response identifying authorization of the second transaction amount.

2. The computing apparatus of claim 1, wherein the transaction handler interconnects a plurality of acquirers and a plurality of issuers in the electronic payment processing network.

3. The computing apparatus of claim 1, wherein the offer is applicable to items in a first category but not items in a second category.

4. The computing apparatus of claim 1, wherein the plurality of transaction sub-amounts do not include taxes applicable according to the plurality of rates.

5. The computing apparatus of claim 4, wherein the second transaction amount includes sales taxes computed according to the plurality of rates.

* * * * *